(12) United States Patent
Vasseur et al.

(10) Patent No.: US 11,711,271 B2
(45) Date of Patent: *Jul. 25, 2023

(54) PREDICTIVE ROUTING USING MACHINE LEARNING IN SD-WANS

(71) Applicant: Cisco Technology, Inc., San Jose, CA (US)

(72) Inventors: Jean-Philippe Vasseur, Saint Martin D'uriage (FR); Grégory Mermoud, Venthône (CH); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/500,200

(22) Filed: Oct. 13, 2021

(65) Prior Publication Data

US 2022/0038347 A1 Feb. 3, 2022

Related U.S. Application Data

(63) Continuation of application No. 16/362,819, filed on Mar. 25, 2019, now Pat. No. 11,159,447.

(51) Int. Cl.
| | |
|---|---|
| *H04L 12/24* | (2006.01) |
| *H04L 12/703* | (2013.01) |
| *G06N 5/02* | (2023.01) |
| *H04L 41/147* | (2022.01) |
| *G06N 20/00* | (2019.01) |

(Continued)

(52) U.S. Cl.
CPC .......... *H04L 41/147* (2013.01); *G06F 18/214* (2023.01); *G06F 18/2185* (2023.01); *G06N 20/00* (2019.01); *H04L 12/4633* (2013.01); *H04L 45/22* (2013.01); *H04L 45/28* (2013.01); *H04L 47/746* (2013.01)

(58) Field of Classification Search
CPC ....... H04L 41/147; H04L 45/28; H04L 41/16; G06N 5/022
See application file for complete search history.

(56) References Cited

U.S. PATENT DOCUMENTS

| | | |
|---|---|---|
| 5,720,003 A | 2/1998 | Chiang |
| 9,749,188 B2 | 8/2017 | Vasseur et al. |

(Continued)

OTHER PUBLICATIONS

"Bomin Mao et al., A novel Non-Supervised Deep-Learning0Based Network Traffic Control Method for Software Defined Wireless Networks, Aug. 2018, IEE Wireless Communication, col. 25, Issue 4, pp. 75-81" (Year: 2018).*

(Continued)

*Primary Examiner* — Rasheed Gidado
(74) *Attorney, Agent, or Firm* — Behmke Innovation Group LLC; James M. Behmke; Jonathon P. Western

(57) ABSTRACT

In one embodiment, a supervisory service for a software-defined wide area network (SD-WAN) obtains telemetry data from one or more edge devices in the SD-WAN. The service trains, using the telemetry data as training data, a machine learning-based model to predict tunnel failures in the SD-WAN. The service receives feedback from the one or more edge devices regarding failure predictions made by the trained machine learning-based model. The service retrains the machine learning-based model, based on the received feedback.

20 Claims, 13 Drawing Sheets

(51) Int. Cl.
  *H04L 12/46*     (2006.01)
  *H04L 45/00*     (2022.01)
  *H04L 45/28*     (2022.01)
  *H04L 47/74*     (2022.01)
  *G06F 18/214*    (2023.01)
  *G06F 18/21*     (2023.01)

(56) References Cited

U.S. PATENT DOCUMENTS

| | | | |
|---|---|---|---|
| 9,774,522 | B2 | 9/2017 | Vasseur et al. |
| 9,853,882 | B2 | 12/2017 | Vasseur et al. |
| 9,887,874 | B2 | 2/2018 | Vasseur et al. |
| 10,069,684 | B2 | 9/2018 | Kant et al. |
| 10,212,043 | B1 | 2/2019 | Gupta |
| 10,721,165 | B2 | 7/2020 | Evans |
| 2015/0195192 | A1 | 7/2015 | Vasseur et al. |
| 2015/0317197 | A1* | 11/2015 | Blair .................. G06N 7/005 714/47.3 |
| 2017/0149639 | A1 | 5/2017 | Vasseur et al. |
| 2017/0236514 | A1 | 8/2017 | Nelson |
| 2017/0366398 | A1 | 12/2017 | Mizrachi |
| 2018/0220210 | A1 | 8/2018 | Paraschis et al. |
| 2018/0278486 | A1 | 9/2018 | Mermoud et al. |
| 2019/0036789 | A1 | 1/2019 | Kaplunov et al. |
| 2019/0036816 | A1 | 1/2019 | Evans et al. |
| 2019/0044824 | A1* | 2/2019 | Yadav .................. H04W 24/08 |
| 2019/0044988 | A1* | 2/2019 | Oesterreicher .... H04N 21/4788 |
| 2019/0116485 | A1 | 4/2019 | Vasseur et al. |
| 2019/0147364 | A1* | 5/2019 | Alt ......................... G06N 20/10 706/12 |
| 2019/0236417 | A1 | 8/2019 | Yun |
| 2019/0270687 | A1* | 9/2019 | Maury .................. C07C 5/2775 |
| 2019/0370687 | A1 | 12/2019 | Pezzillo |
| 2020/0160207 | A1 | 5/2020 | Song |

OTHER PUBLICATIONS

Sergey Gordeychik, "SD-WAN Threat Landscape", arxiv.org, Cornell University Library, Nov. 12, 2018, Chapter "Basic Network Functions", pp. 12-14, and figure 5.

European Search Report dated Jul. 22, 2020 in connection with European Application No. 2016 4892.

European Office Action dated Mar. 29, 2022, in connection with European Patent Application No. 20164892.0.

* cited by examiner

PREDICTIVE ROUTING USING MACHINE LEARNING IN SD-WANS

RELATED APPLICATION

This application is a continuation of U.S. patent application Ser. No. 16/362,819, filed on Mar. 25, 2019, entitled PREDICTIVE ROUTING USING MACHINE LEARNING IN SD-WANs, by Jean-Philippe Vasseur et al., the entire contents of which are incorporated by reference herein.

TECHNICAL FIELD

The present disclosure relates generally to computer networks, and, more particularly, to predictive routing using machine learning in software-defined wide area networks (SD-WANs).

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits. While this approach is somewhat effective at mitigating tunnel failures in an SD-WAN, reactive failure detection is also predicated on a failure first occurring. This means that traffic will be affected by the failure, until the traffic is moved to another tunnel.

DESCRIPTION OF EXAMPLE EMBODIMENTS

Overview

Figure 1A:
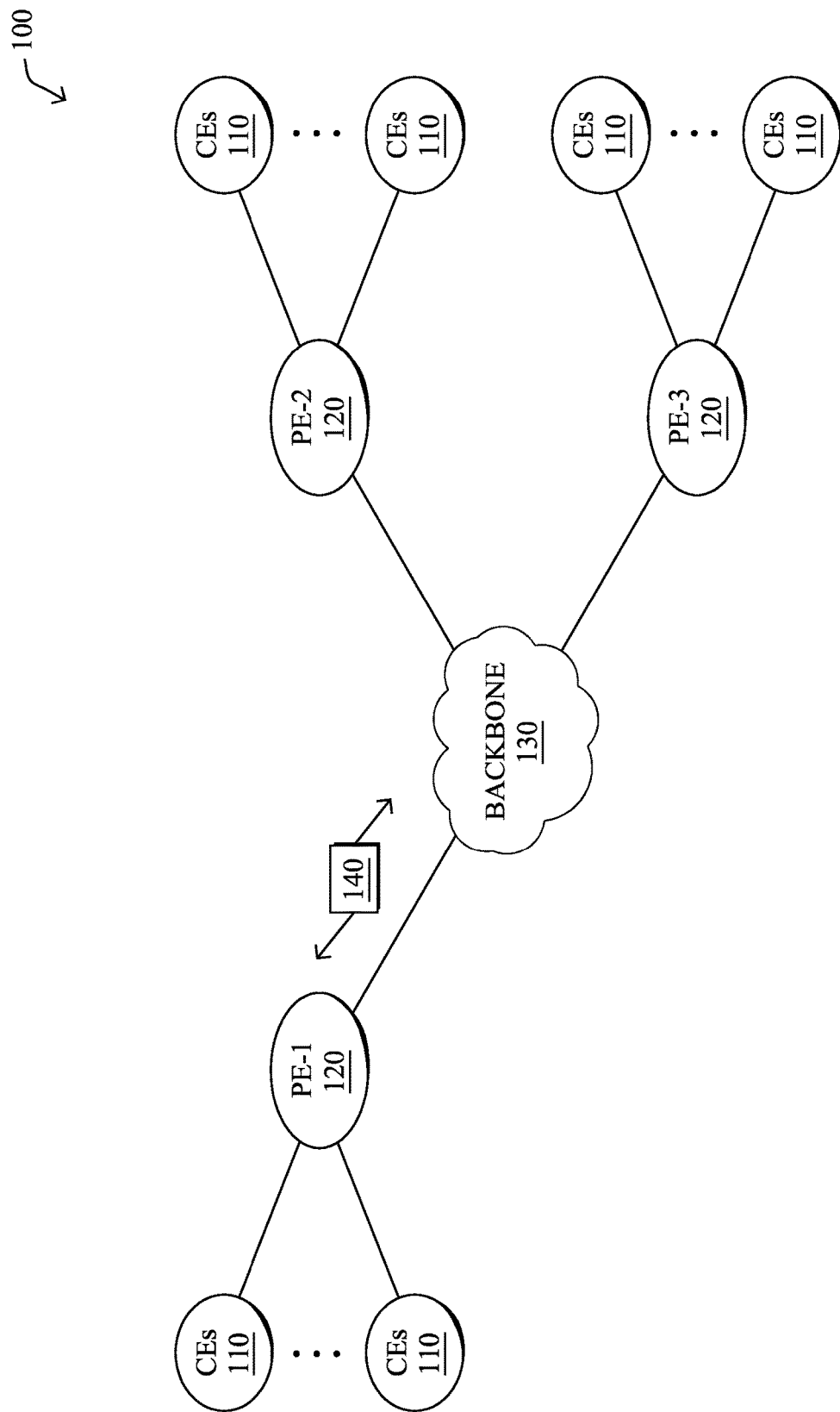
FIGS. 1A-1B illustrate an example communication network.

According to one or more embodiments of the disclosure, a supervisory service for a software-defined wide area network (SD-WAN) obtains telemetry data from one or more edge devices in the SD-WAN. The service trains, using the telemetry data as training data, a machine learning-based model to predict tunnel failures in the SD-WAN. The service receives feedback from the one or more edge devices regarding failure predictions made by the trained machine learning-based model. The service retrains the machine learning-based model, based on the received feedback.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
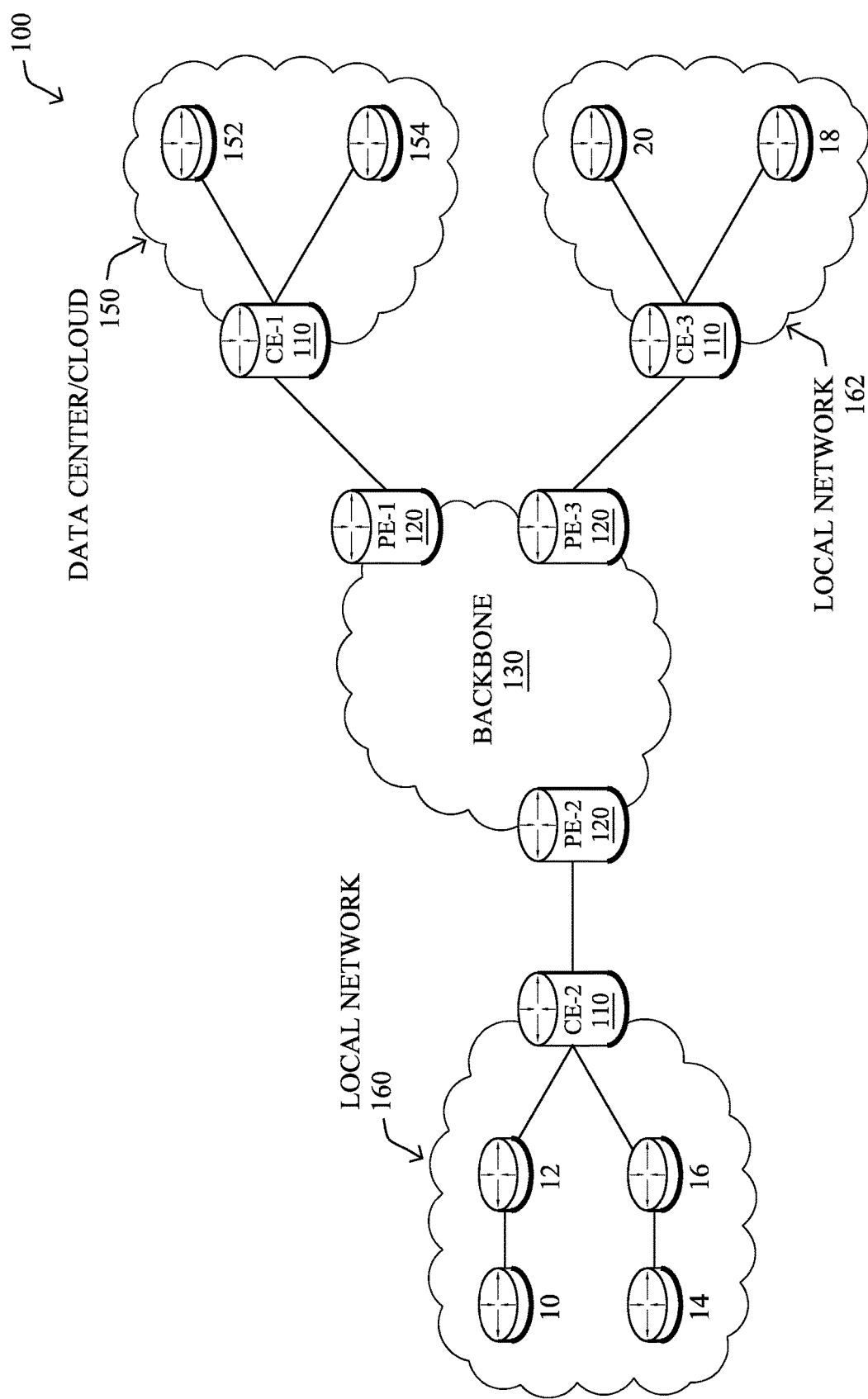

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
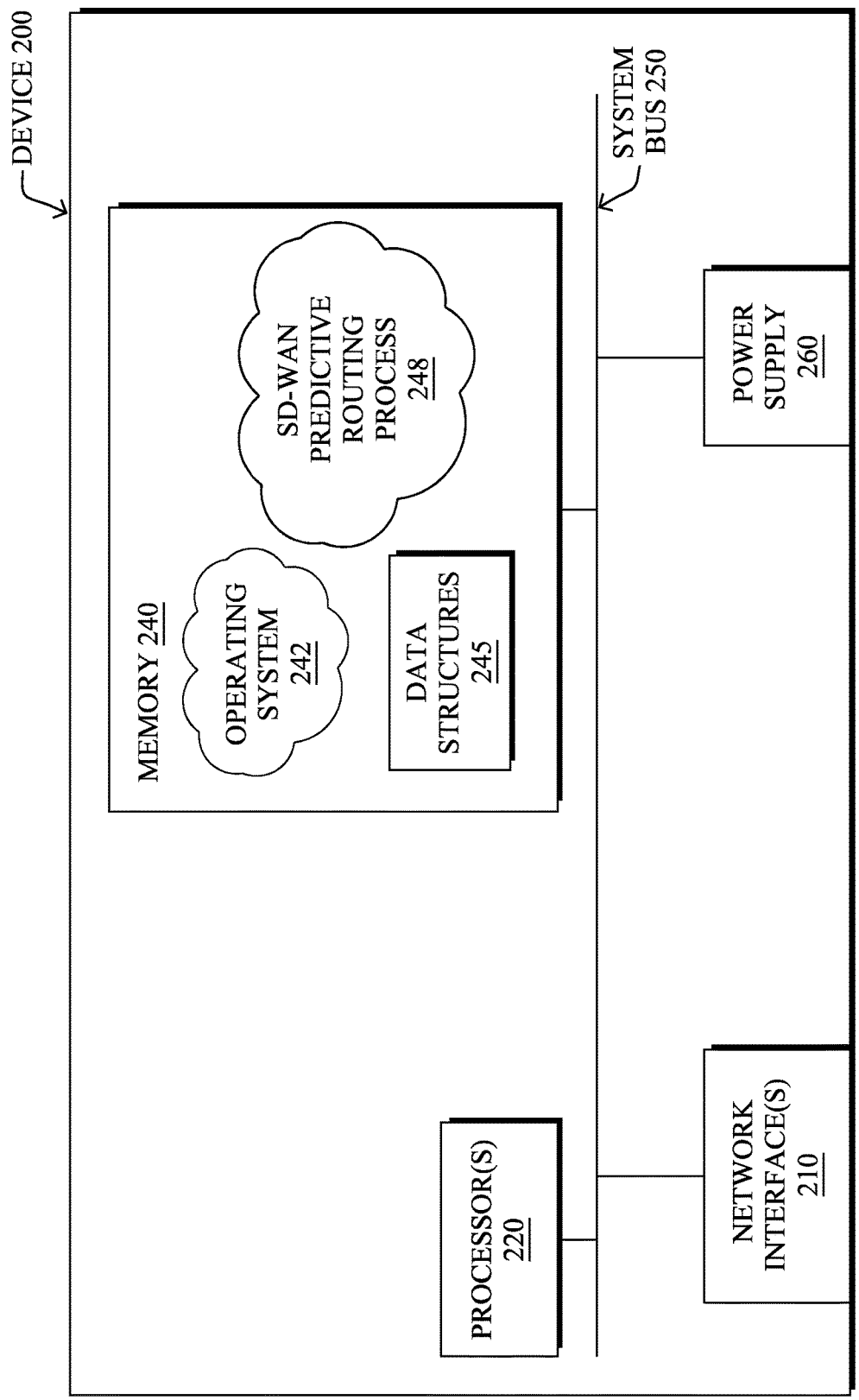
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an SD-WAN predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

SD-WAN predictive routing process 248, detailed further below, includes computer executable instructions that, when executed by processor(s) 220, cause device 200 to predict SD-WAN tunnel failures and proactively reroute traffic to different tunnels, prior to their current tunnels failing. To do so, in some embodiments, SD-WAN predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, SD-WAN predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of an SD-WAN tunnel failure or indicative of normal tunnel operation. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that SD-WAN predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that an SD-WAN tunnel will fail. Conversely, the false negatives of the model may refer to the number of times the model predicted normal tunnel operations, when the tunnel actually fails. True negatives and positives may refer to the number of times the model correctly predicted whether a tunnel will perform normally or will fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, failure detection in a network has traditionally been reactive, meaning that the failure must first be detected before rerouting the traffic along a secondary (backup) path. This is true, not only for IP and MPLS networks, but also for optical networks (with protection and restoration) such as SONET and SDH networks. Typically, failure detection leverages either explicit signaling from the lower network layers (e.g., optical failures signaled to the upper layers) or using a keep-alive mechanism that sends probes at some interval T that must be acknowledged by a receiver (e.g., a tunnel tail-end router). For example, routing protocols such as Open Shortest Path First (OSPF) and Intermediate System to Intermediate System (IS-IS) use keep-alive signals over routing adjacencies or MPLS traffic engineering (TE) tunnels. Protocols such as Bidirectional Forwarding Detection (BFD) also make use of keep-alive mechanisms.

Traditionally, failure detection in an SD-WAN has relied on the keep-alive mechanisms of BFD over tunnels, such as IPSec tunnels. When the BFD signaling times out, the tunnel is flagged as failed and traffic is rerouted onto another tunnel. While this approach does help to mitigate the effects of the failure, the reactive nature of this approach also means that at least some of the traffic will be lost. What is needed is a proactive and predictive approach that is able to identify SD-WAN tunnel failures before they actually occur.

Predictive Routing Using Machine Learning in SD-WANs

The techniques herein introduce a radical shift for routing in an SD-WAN whereby telemetry is gathered from edge devices (e.g., CE routers, etc.) that relates to failures of tunnel in the SD-WAN along with variables/parameters that could be used to detect such failure. In some aspects, machine learning is leveraged to forecast such failures (e.g., identifying parameters with predictive power, computing sampling rates, evaluating PRC performance) either specific to a network, a tunnel, or globally for a set of networks. In further aspects, the failure forecasting models may be queried globally (e.g., in the cloud) or locally (e.g., on-premises), according to the required telemetry variables and their sampling frequency, the resources available on router and in the network. In turn, failure predictions may be signaled back to edge device, in the case of global forecasting, and/or reports of actual false positives or negatives, as well as their contextual data, may be signaled back to the failure forecasting engine, in the case of local forecasting.

Specifically, according to one or more embodiments herein, a supervisory service for a software-defined wide area network (SD-WAN) obtains telemetry data from one or more edge devices in the SD-WAN. The service trains, using the telemetry data as training data, a machine learning-based model to predict tunnel failures in the SD-WAN. The service receives feedback from the one or more edge devices regarding failure predictions made by the trained machine learning-based model. The service retrains the machine learning-based model, based on the received feedback.

Illustratively, the techniques described herein may be performed by hardware, software, and/or firmware, such as in accordance with the SD-WAN predictive routing process 248, which may include computer executable instructions executed by the processor 220 (or independent processor of interfaces 210) to perform functions relating to the techniques described herein.

Figure 3:
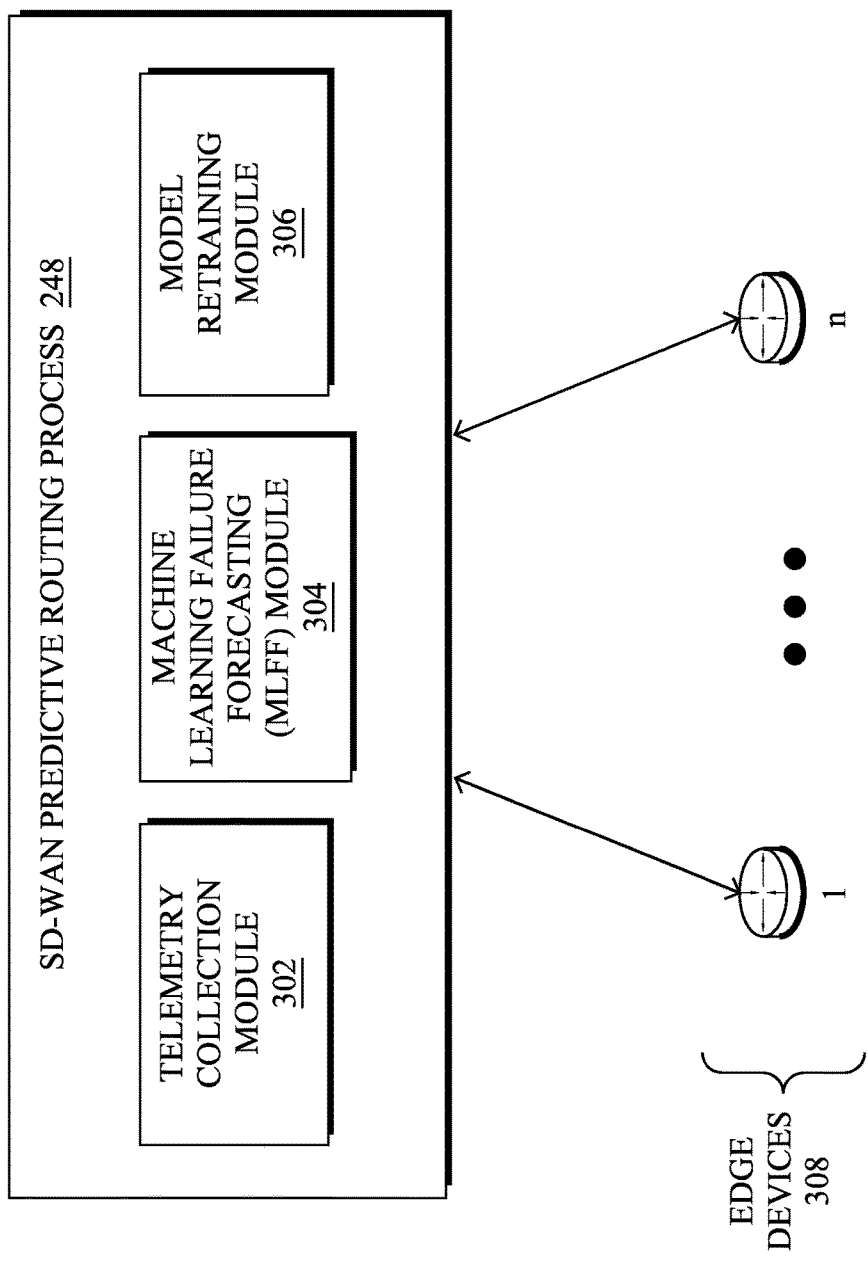
FIG. 3 illustrates an example architecture for predicting tunnel failures in a software-defined wide area network (SD-WAN)

Operationally, FIG. 3 illustrates an example architecture 300 for predicting tunnel failures in an SD-WAN, according to various embodiments. In general, architecture 300 may be implemented by a device (e.g., device 200 described previously) executing specialized instructions, such as SD-WAN predictive routing process 248, to provide a supervisory service to one or more SD-WAN instances. For example, an SD-WAN controller or other monitoring service may implement architecture 300 either locally in the network or as a cloud-based service. As shown, SD-WAN predictive routing process 248 may include the following components: a telemetry collection module 302, a machine learning failure forecasting (MLFF) module 304, and/or a model retraining module 306. These components 302-306 may be implemented in a distributed manner or implemented as their own stand-alone services, either as part of the network under observation or as a remote service. In addition, the functionalities of the components of architecture 300 may be combined, omitted, or implemented as part of other processes, as desired.

SD-WAN predictive routing process 248 may be in communication with any number of edge devices 308 (e.g., a first through $n^{th}$ device), such as CE routers 110, described previously. In various embodiments, edge devices 308 may be part of the same SD-WAN or, in cases in which process 248 is implemented as a cloud-based service, part of any number of different SD-WANs.

In general, there are many circumstances in a network that can lead to tunnel failures in various areas of the network between a head-end and tail-end router (e.g., between routers 110, etc.). An objective of MLFF 304, as detailed below, is to learn early signs (networking behavioral) that have some predictive power, allowing the model to predict/forecast a tunnel failure. It is expected that some failures are predictable (i.e., there exist early signs of an upcoming failure) while others will not be non-predictable (e.g., fiber cut, router crash, etc.). More specifically, almost all failures exhibit early signs, but those signs may appear only a few milliseconds (or even nanoseconds), prior to the failure (e.g. fiber cut), thereby making forecasting an almost impossible task. Some non-predictable failures may be due to the absence of signaling back to the edge device 308 involved and may be localized to the core of the service provider network (e.g., the underlying IP, 4G, 5G, etc. network), in which case the failure is non-predicable from the perspective of the edge device 308.

A first aspect of architecture 300 relates to telemetry collection module 302 obtaining the telemetry data required for model training by MLFF module 304. As used herein, the term 'relevant telemetry' refers to a telemetry measurement variable with predictive power to predict tunnel failures, which can be determined dynamically by MLFF module 304. Indeed, failures may be predictable, yet not successfully predicted, due to a lack of relevant telemetry, the inability of the model to predict the failure, or the telemetry is sampled at too coarse of a time granularity. In some embodiments, to obtain relevant telemetry from edge devices 308, process 248 may send a custom request to one or more of devices 308 with the objective of obtaining the list of events of interest along with the set of candidate telemetry variables with potential predictive power to predict tunnel failures. In further embodiments, edge devices 308 may instead provide the telemetry data to process 248 on a push basis (e.g., without process 248 first requesting the telemetry data).

In various embodiments, telemetry collection module 302 may adjust the set of telemetry variables/parameters obtained from the edge device(s) 308 and/or their sampling frequency. If, for example, MLFF module 304 determines that a particular telemetry variable has a strong predictive power (according to the feature importance, Shapley values, etc.), the frequency at which such a variable may be gathered may be higher compared to a variable with lower predictive power.

Figure 4A:
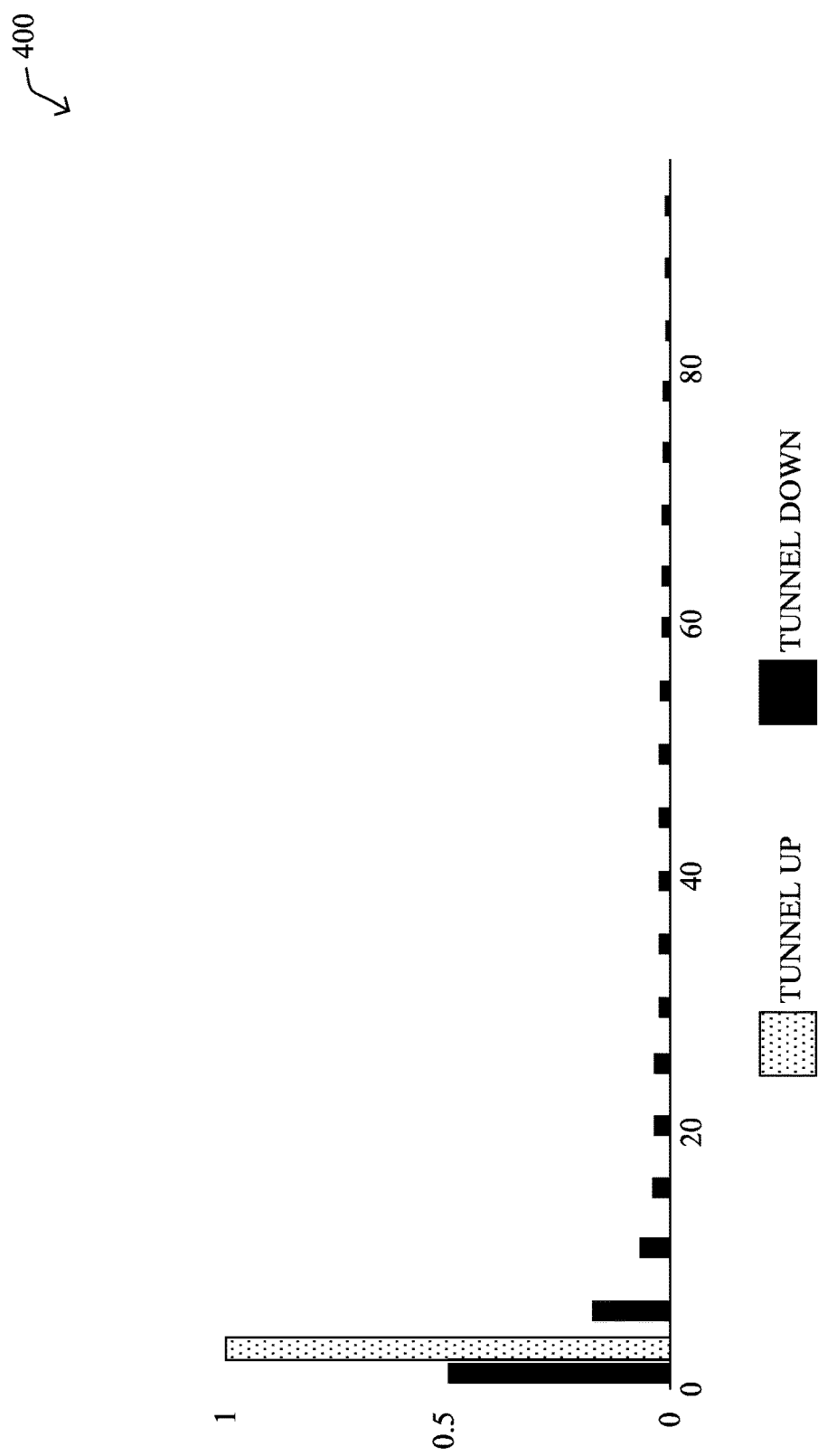
FIGS. 4A-4B illustrate example plots of packet loss telemetry during tunnel up and tunnel down events.
Figure 4B:
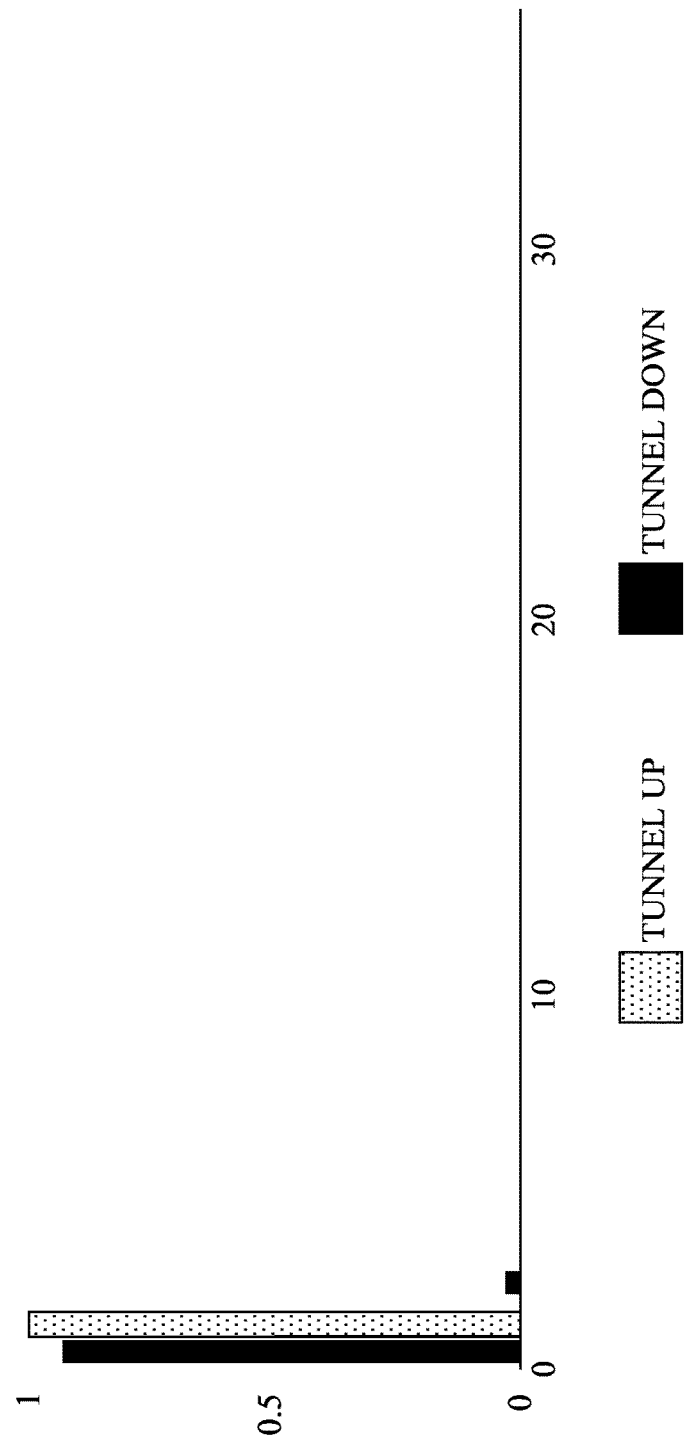

MLFF module 304 may also determine the predictive power of a particular telemetry variable by assessing the conditional probabilities involved, in further embodiments. By way of example, FIGS. 4A-4B illustrate example plots of packet loss telemetry during tunnel up and tunnel down events. As shown in FIG. 4A, plot 400 illustrates the probability distribution function (PDF) of a packet loss measurement for both tunnel up events and tunnel down (i.e., failure) events. In FIG. 4B, plot 410 also illustrates a PDF of the packet loss measurement for the two event types. From these plots, it can be seen that the loss measurement is a good predictor of the failure events. Also, as would be appreciated, a high p-value indicates that the distribution may differ significantly.

Figure 5A:
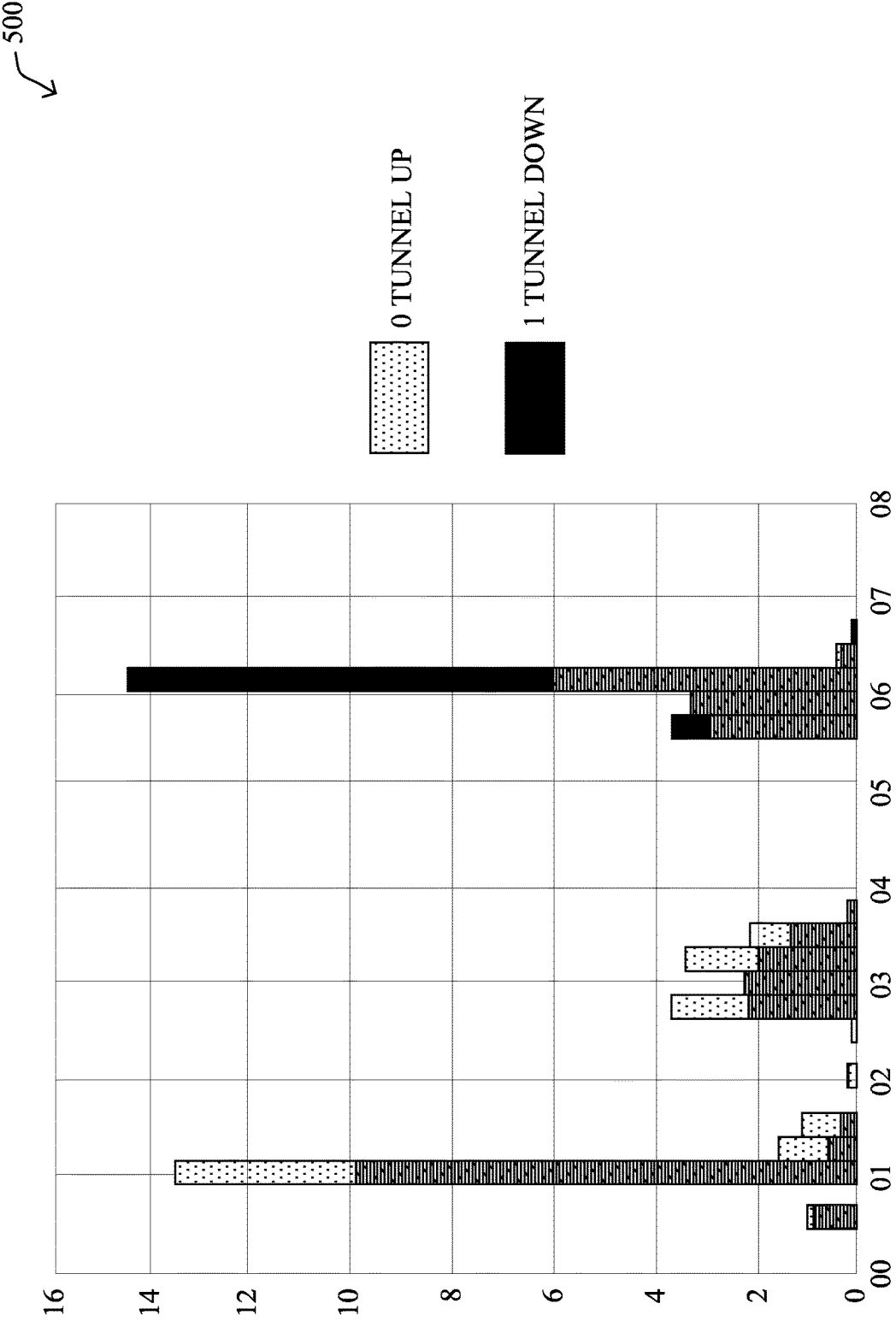
FIGS. 5A-5B illustrate example plots of device resource usage during tunnel up and tunnel down events.
Figure 5B:
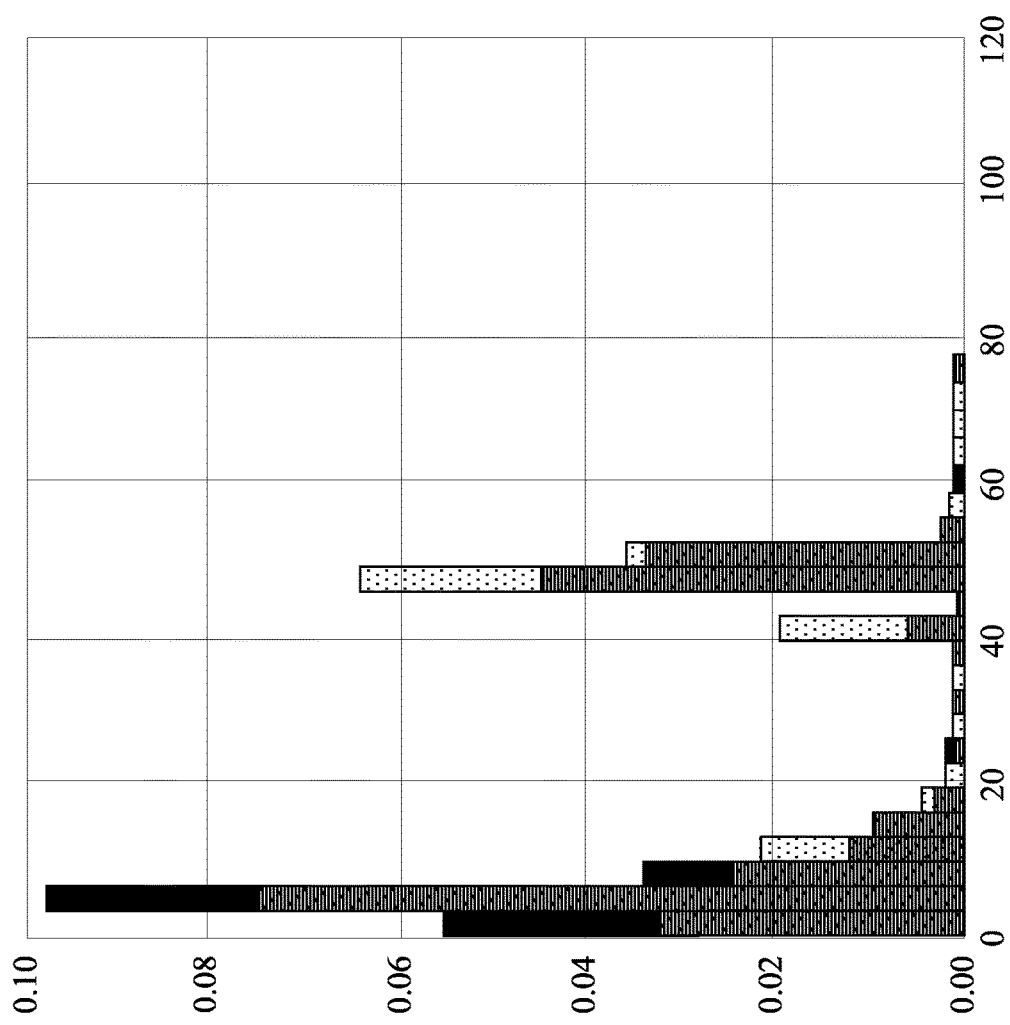

FIGS. 5A-5B illustrate further example plots of device resource usage during tunnel up and tunnel down events. In plot 500 in FIG. 5A, the memory utilization by an edge device is shown for both tunnel up and tunnel down events. Similarly, plot 510 in FIG. 5B illustrates the CPU utilization by the device during these two event types. By assessing the relationships between tunnel down events and the various telemetry variables available, MLFF module 304 shown in FIG. 3 can infer that the CPU and memory variables have the highest measures of predictive power, since many tunnel down events are more probable during high CPU or memory utilization when compared to tunnel up events.

Referring again to architecture 300 in FIG. 3, MLFF module 304 may select the set of most relevant telemetry variables. In turn, telemetry collection module 302 may request that edge devices 308 measure and send these variables to process 248 periodically, since real-time variations of such telemetry is needed for forecasting tunnel down events. For example, based on the above conclusion, MLFF module 304 may determine that the CPU and memory utilizations should be sent periodically (e.g., every 1 second) by edge devices 308.

Other telemetry variables, such as during a rekey failure when the edge router is not able to successfully exchange the security keys with the controller, may be requested to be sent to process 248, on occurrence of the event. Since such events are rare and the states of the variables remain the same for longer periods of time, telemetry collection module 302 may request an event-based push request, rather than periodic messages. In other words, telemetry collection module 302 may instruct one or more of edge devices 308 to report certain telemetry variables only after occurrence of certain events. For example, Table 1 below shows some example telemetry variables and when an edge device 308 may report them to process 248:

TABLE 1

| Relevant Telemetry | Request Type |
| --- | --- |
| Memory_utilization | Requested from head and tail edge routers. |
| CPU Utilization | |
| BFD Probe Latency, Loss and Jitter | Periodically once every 1 second. |
| Queue statistics (%-age drops for different queues) | |
| Interface down event | |
| Rekey exchange failure | |
| Router crash logs | Requested from both head and tail edge routers Upon event occurrence. |

In a further embodiment, MLFF module 304 may also attempt to optimize the load imposed on the edge device(s) 308 reporting the telemetry variables to process 248. For example, MLFF module 304 may determine that the CPU and memory usages should be measured and reported every minute to process 248.

Figure 6:
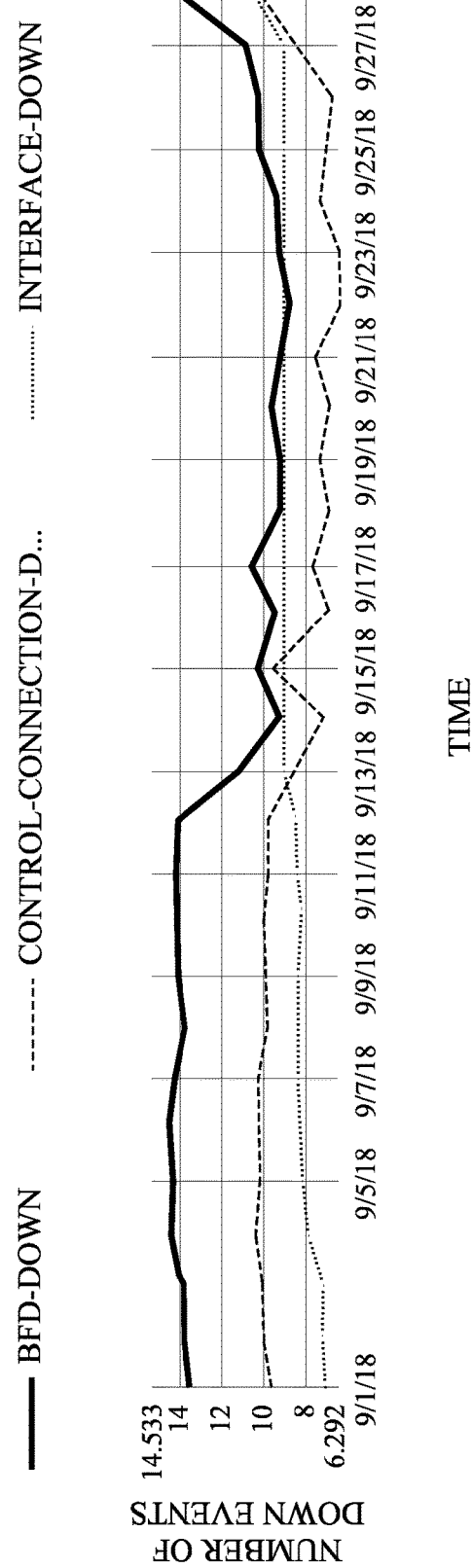
FIG. 6 illustrates an example plot of tunnel down events versus control connection down and interface down events.

In some cases, MLFF module 304 may also be configured to perform root-cause analysis on the failure events, to identify the root cause of the failures. For example, FIG. 6 illustrates an example plot 600 of tunnel down events versus control connection down and interface down events. From such information, MLFF module 304 may perform root-cause analysis to infer that there is a causal link between the control connection down events and the bfd down (tunnel down) events. In turn, MLFF module 304 may infer that the control connection failures are likely the root cause of the tunnel down failures and request that edge device(s) 308 monitor the root-cause events and report their occurrence to process 248.

Referring again to FIG. 3, a key functionality of MLFF module 304 is to train any number of machine learning-based models to predict tunnel failures in the SD-WAN(s). Preferably, the models are time-series models trained centrally (e.g., in the cloud) using the telemetry collected by telemetry collection module 302. In one instantiation of MLFF module 304, the models may be trained on a per customer or per-SD-WAN basis. Testing has shown that model performance may be influenced by parameters specific to a given network instantiation, thus promoting an implementation whereby MLFF module 304 trains a model for a specific network deployment. In further embodiments, MLFF module 304 may even train certain models on a per-tunnel basis. Although such an approach may be of limited scalability, it may be highly valuable for tunnels carrying a very large amount of potentially very sensitive traffic (e.g., inter-cloud/data center traffic).

As pointed out earlier, with current reactive routing approaches, recall (i.e., the proportion of failures being successfully predicted) is simply equal to 0, since rerouting is always reactive. In other words, the system reacts a posteriori. As a result, any recall >0 is a significant gain. One performance metric that MLFF module 304 may consider is the maximum recall (Max_Recall) achieved by the model given a precision >P_Min. For example, MLFF module 304 may evaluate the variability of Max_Recall across datasets, should a single model be trained across all datasets, to determine whether an SD-WAN specific or even a tunnel specific model should be trained.

In various embodiments, MLFF module 304 may dynamically switch between per-tunnel, per-customer/SD-WAN, and global (multiple SD-WAN) approaches to model training. For example, MLFF module 304 may start with the least granular approach (e.g., a global model across all customers/SD-WANs) and then evaluate the performance of the global model versus that of per-customer/SD-WAN models. Such model performance comparison could be easily evaluated by comparing their related precision-recall curves (PRCs)/area under the curve (AUCs), or the relative Max_Recall, given that Precision >P_min.

Figure 7:
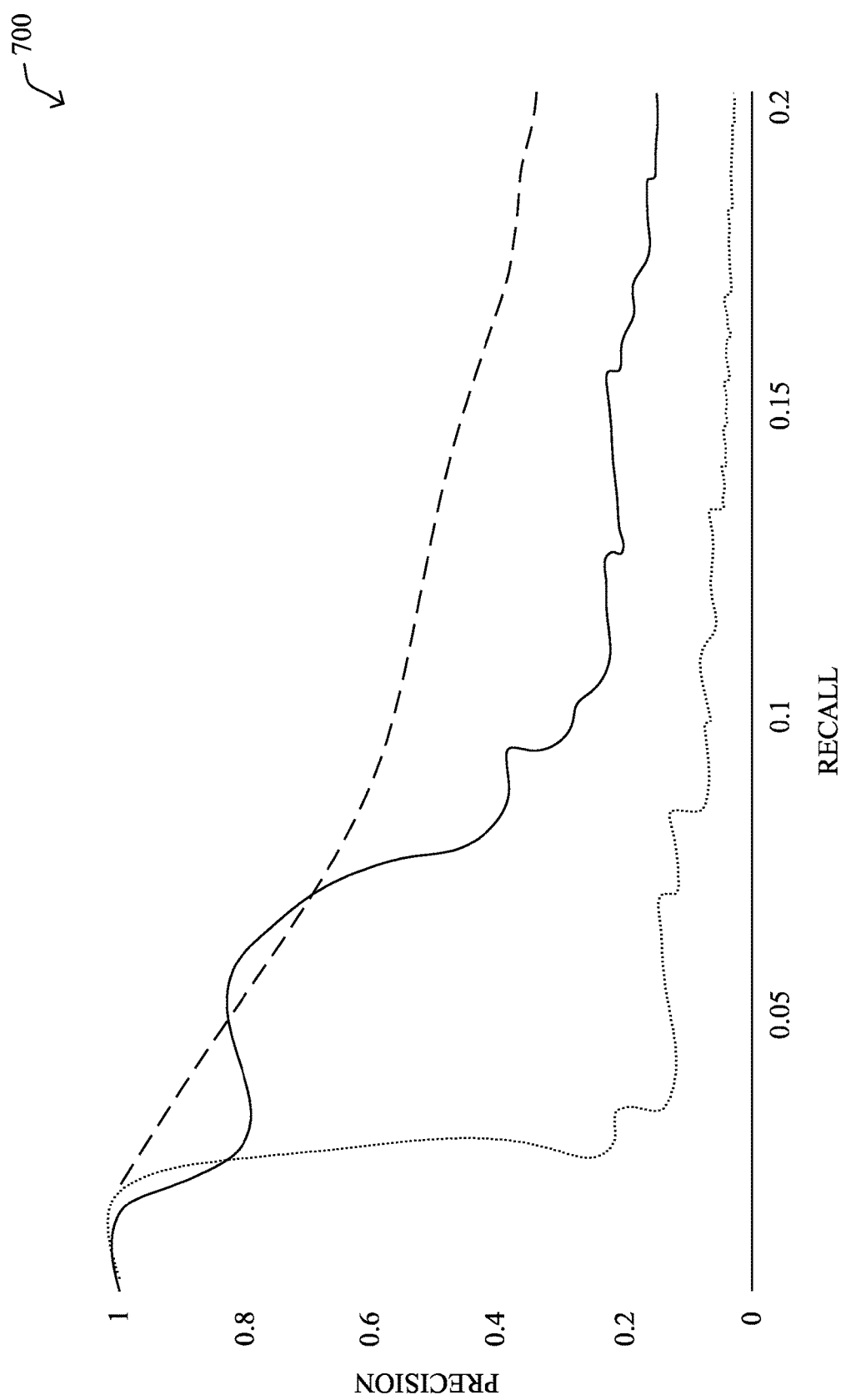
FIG. 7 illustrates an example plot of precision-recall curves of a failure prediction model for different tunnels.

FIG. 7 illustrates an example plot 700 of precision-recall curves of a failure prediction model for different tunnels of the same SD-WAN implementation. The different curves indicate different splits of the dataset for the same customer and that the performance of the model can vary significantly, even within the same network. This insight can drive MLFF module 304 to train more granular failure prediction models, such as per-tunnel models for the tunnels for which the current model performs poorly.

Referring again to FIG. 3, in some cases, MLFF module 304 may employ a policy to trigger per-customer/SD-WAN specific model training, if the Max_Recall value improvement is greater than a given threshold. In another embodiment, a similar policy approach may be used to specifically require a dedicated model for a given tunnel according to its characteristic (between router A and router B), the type of traffic being carried out (e.g., sensitive traffic of type T, etc.), or the performance of the global or SD-WAN specific model for that tunnel. In such a case, the edge devices 308 may be in charge of observing the routed traffic and, on detecting a traffic type matching the policy, request specific model training by MLFF module 304, to start per-tunnel model training for that tunnel.

Prototyping of the techniques herein using simple models and input features based on coarse telemetry, such as 1-minute averages of loss, latency, jitter, traffic, as well as CPU/memory of CE routers, lead to recalls in the range of a few percent with a precision of 80% or more. More advanced time-series models, such as long short-term memories (LSTMs), especially with attention mechanisms, will achieve even better performance. More importantly, using richer and more fine-grained telemetry is an important driver of the forecasting performance.

Once MLFF module 304 has trained a prediction model, different options exist for its inference location (e.g., where the model is executed to predict tunnel failures). In a first embodiment, model inference is performed centrally (in the cloud), thus co-located with the model training. In such a case, once MLFF module 304 identifies the set of telemetry variables with predictive power (used for prediction), telemetry collection module 302 may send a custom message to the corresponding edge device(s) 308 listing the set of variables along with their sampling/reporting frequencies. Note that sampling is a dynamic parameter used by MLFF module 304 computed so as to optimize the PRC of the model against the additional overhead of the edge device 308 pushing additional data to the cloud (and also generating additional logging of data on the router).

In another embodiment, MLFF module 304 may push the inference task, and the corresponding prediction model, to a specific edge device 308, so that the prediction is preformed on-premise. Such an approach may be triggered by the frequency of sampling required to achieve the required model performance. For example, some failure types are known to provide signal a few seconds, or even milliseconds, before the failure. In such cases, performing the inference in the cloud is not a viable option, making on-premise execution of the model the better approach. Inference/model execution is usually not an expensive task on premise, especially when compared to model training. That being said, it may require fast processing on local event with an impact on the local CPU. In yet another embodiment, some models may be executed on premise, if the local resources on the router/edge device 308 are sufficient to feed the local model.

Thus, in some cases, the techniques herein support centralized model training (e.g., in the cloud), combined with the ability to perform local (on-premise) inference based on the required sampling frequency, local resources available on the edge device 308, as well as the bandwidth required to send the telemetry for input to a model in the cloud. For example, one failure prediction model may require a slow sampling rate but a large amount of data, due to a high number of input features with predictive power. Thus, reporting these telemetry variables to the cloud for prediction may consume too much WAN bandwidth on the network. In such a case, MLFF module 304 may take this constraint into account by evaluating the volume of required telemetry, according to the sampling frequency, and the WAN bandwidth allocated on the network for the telemetry traffic. To that end, MLFF module 304 may analyze the topology of the network and the available bandwidth for telemetry reporting (e.g., according to the QoS policy). If the bandwidth available for the telemetry used for the inference of the model exceeds the capacity, MLFF module 304 may decide to activate a local inference by pushing a prediction model to one or more of edge devices 308.

In yet another embodiment, MLFF module 304 may take a mixed approach whereby some of edge devices 308 perform the inferences locally, while others rely on SD-WAN predictive routing process 248 to perform the predictions.

A further embodiment of the techniques herein introduces a feedback mechanism whereby feedback regarding the predictions by a trained model is provided to model retraining module 306. In cases in which the model is executed on an edge device 308, the edge device 308 may report the rate of false positives and/or false negatives to model retraining module 308. Optionally, the reporting can also include additional context information about each false positive and/or false negative, such as the values of the telemetry variables that led to the incorrect prediction. If the performance of the model is below a designated threshold, model retraining module 306 may trigger MLFF module 304 to retrain the model, potentially increasing the granularity of the model, as well (e.g., by training a tunnel-specific model, etc.). In cases in which MLFF module 304 trains multiple prediction models, model retraining module 306 may evaluate the performance of each model and, based on their performances, decide that a particular one of the models should be used. Such an approach allows MLFF module 304 to dynamically switch between models, based on the data pattern currently being observed.

When failures are predicted in the cloud by SD-WAN predictive routing process 248, model retraining module 306 may similarly receive feedback from edge devices 308 regarding the predictions. For example, once a model M predicts the failure of a tunnel at a given time, MLFF module 304 may send a notification to the affected edge device 308 indicating the (list of) tunnel(s) for which a failure is predicted, along with the predicted time for the failure, and other parameters such as the failure probability Pf (which can be a simple flag, a categorical variable (low, medium, high) or a real number). The edge device 308 may use Pf to determine the appropriate action, such as pro-actively rerouting the traffic that would be affected by the failure onto a backup tunnel. In one embodiment, the predicted failure may be signaled to the edge device 308 using a unicast message for one or more tunnels, or a multicast messages signaling a list of predicted failure to a set of edge devices 308.

Regardless of how model retraining module 306 receives its feedback, either from the edge device 308 executing the prediction model or from MLFF module 304 executing the model, model retraining module 306 may dynamically trigger MLFF module 304 to retrain a given model. In one embodiment, the model re-training may be systematic. In another embodiment, upon reaching a plateau in terms of improvement for Max_Recall or Max_Precision, model retraining module 306 may reduce the frequency of the model training.

Figure 8A:
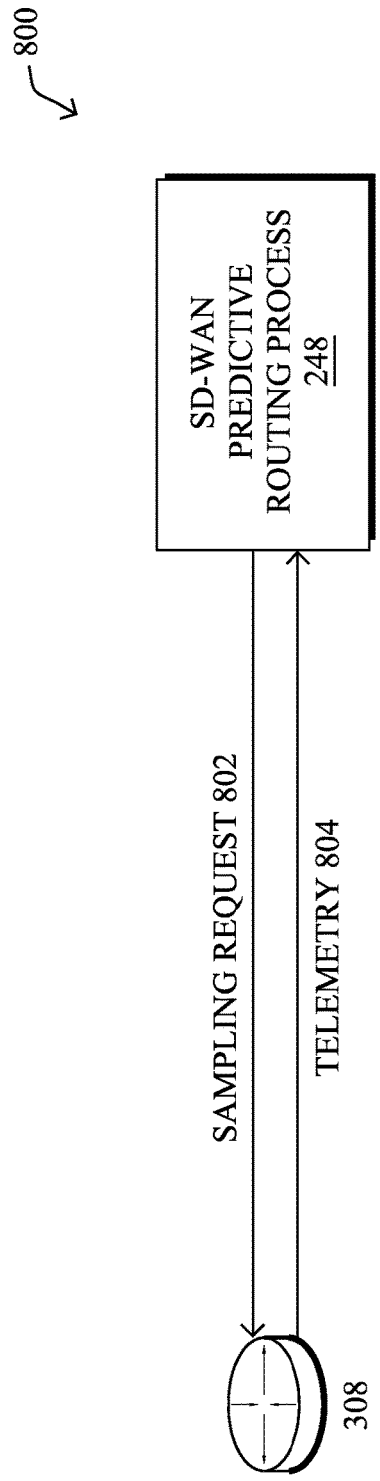
FIGS. 8A-8C illustrate examples of feedback for tunnel failure predictions.
Figure 8B:
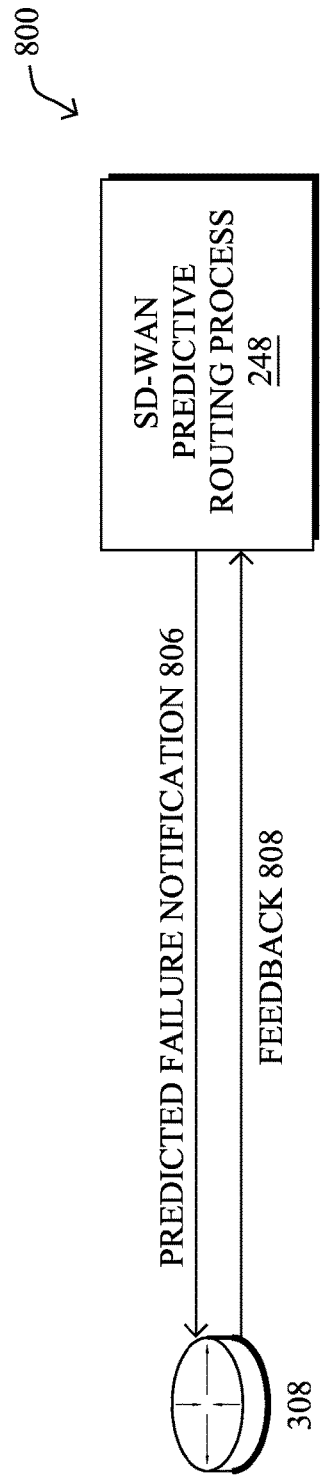
Figure 8C:
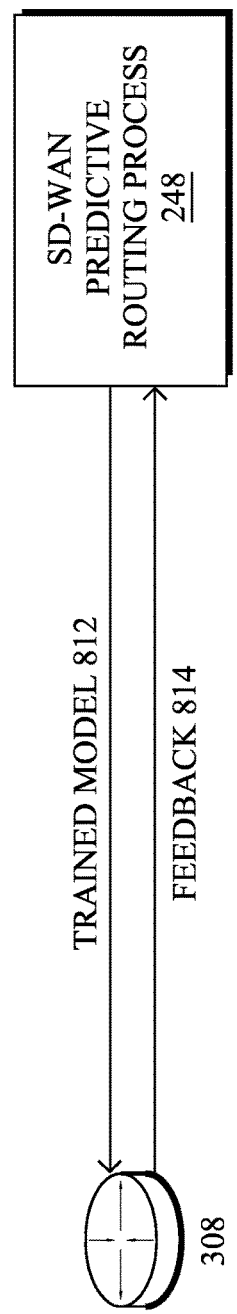

FIGS. 8A-8C illustrate examples of feedback for tunnel failure predictions, in various embodiments. As shown in example implementation 800 in FIGS. 8A-8B, assume that the trained model is executed in the cloud by SD-WAN predictive routing process 248. In such a case, process 248 may send a sampling request 802 to an edge device 308 that indicates the telemetry variables to sample and report, as well as the determined sampling/reporting period(s) for those variables. In turn, edge device 308 may report the requested telemetry 804 to process 248 for analysis. For example, process 248 may request that edge device 308 report is CPU load every minute to process 248, to predict whether the tunnel associated with edge device 308 is predicted to fail. More specifically, process 248 may use telemetry 804 as input to its trained prediction model, to determine whether telemetry 804 is indicative of a tunnel failure that will occur in the future.

When SD-WAN predictive routing process 248 determines that a tunnel failure is predicted, it may send a predicted failure notification 806 to edge device 308 that identifies the tunnel predicted to fail, the time at which the failure is expected to occur, and potentially the probability of failure, as well. Depending on the timing and probability of failure, edge device 308 may opt to reroute the affected traffic, or a portion thereof, to a different tunnel. In turn, edge device 308 may monitor the tunnel predicted to fail and provide feedback 808 to process 248 indicating whether the tunnel actually failed and, if so, when. Process 248 can then use feedback 808 to determine whether model retraining should be initiated, such as by training a more granular model for the SD-WAN instance or the specific tunnel under scrutiny.

FIG. 8C illustrates an alternate implementation 810 in which SD-WAN predictive routing process 248 pushes the failure prediction model to edge device 308 for local/on-premise inference. For example, process 248 may opt for edge device 308 to perform the local inferences, such as when model 812 requires too much bandwidth to send the needed telemetry to process 248 for cloud-based prediction. In turn, edge device 308 may use the corresponding telemetry measurements as input to trained model 812 and, if a failure is predicted, perform a corrective measure such as proactively rerouting the traffic to one or more other tunnels. In addition, edge device 308 may provide feedback 814 to process 248 that indicates false positives and/or false negatives by the model. For example, if edge device 308 reroutes traffic away from a tunnel predicted by model 812 to fail, and the tunnel does not actually fail, edge device 308 may inform process 248. Process 248 may use feedback 814 to determine whether model 812 requires retraining, such as by adjusting which telemetry variables are used as input to the model, adjusting the granularity of the training (e.g., by using only training telemetry data from the tunnel, etc.), or the like.

Figure 9:
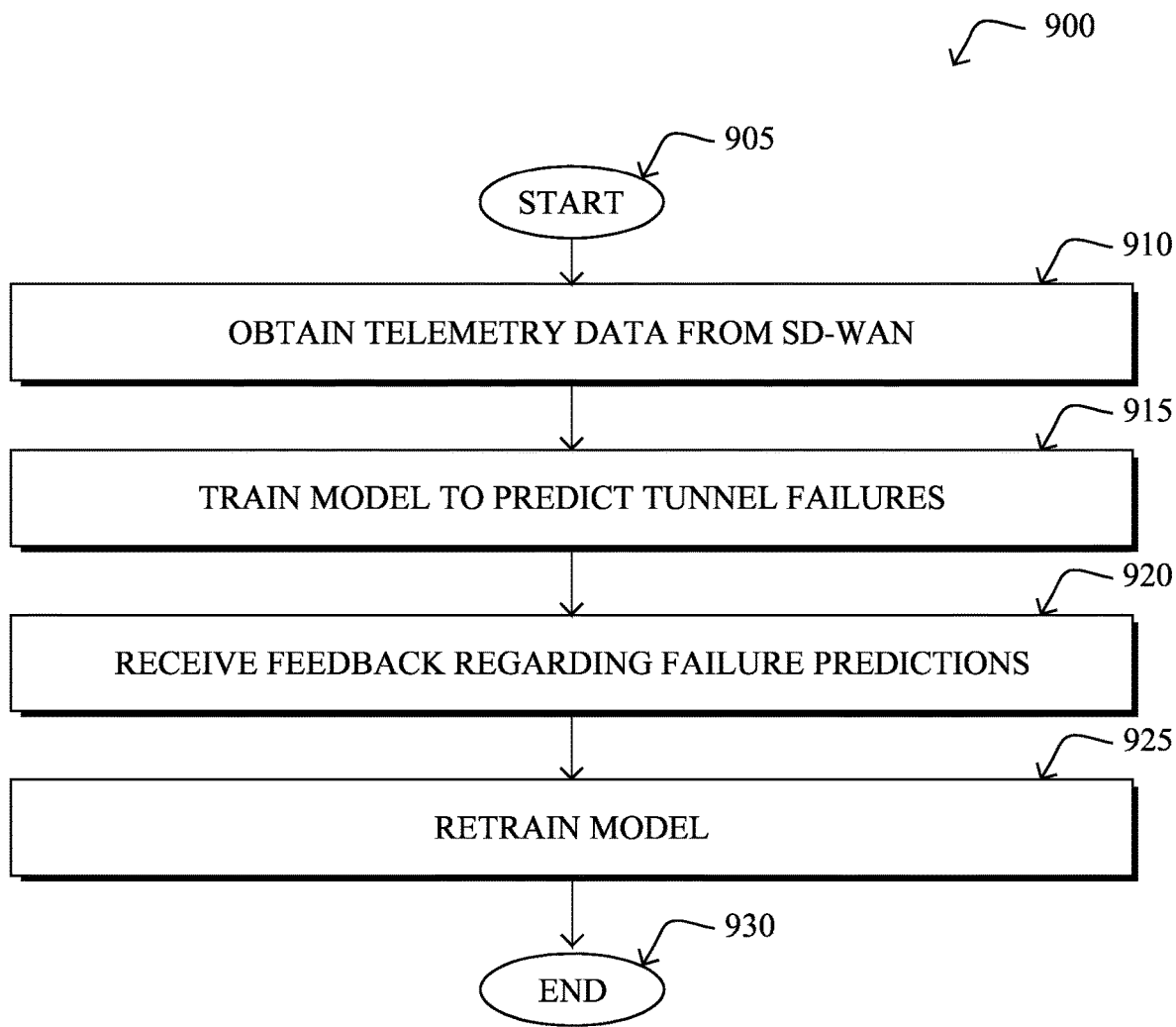
FIG. 9 illustrates an example simplified procedure for predicting tunnel failures in an SD-WAN.

FIG. 9 illustrates an example simplified procedure for predicting tunnel failures in an SD-WAN, in accordance with one or more embodiments described herein. For example, a non-generic, specifically configured device (e.g., device 200) may perform procedure 900 by executing stored instructions (e.g., process 248), to provide a supervisory service to one or more SD-WANs. The procedure 900 may start at step 905, and continues to step 910, where, as described in greater detail above, the supervisory service may obtain telemetry data from one or more edge devices in the SD-WAN. For example, the supervisory service may associate tunnel failures in the SD-WAN(s) with different telemetry variables that can be measured, to assign measures of predictive power to the telemetry variables. In turn, the service may select one or more of the telemetry variables and a sampling frequency, based in part on their associated measures of predictive power, and instruct the one or more edge devices to report the selected one or more telemetry variables to the supervisory service at the selected sampling frequency. In some cases, the sampling frequency can also be selected based in part on the expected load on the edge device(s) that would result from the sampling. In further cases, the supervisory service may request that the edge device(s) report the occurrences of certain events that may be indicative of an impending tunnel failure.

At step 915, as detailed above, the supervisory service may train, using the telemetry data as training data, a machine learning-based model to predict tunnel failures in the SD-WAN. For example, the model may be a time series-based model that predicts tunnel failures, based on the values of the telemetry data. In various embodiments, the supervisory service may train the model using training data for a particular tunnel, a particular SD-WAN, or may even perform global training of the model using telemetry data from a plurality of SD-WANs overseen by the supervisory service. Such training can also be performed in a dynamic manner, so as to increase or decrease the granularity of the model, as needed.

At step 920, the supervisory service may receive feedback from the one or more edge devices regarding failure predictions made by the trained machine learning-based model, as described in greater detail above. Such feedback may indicate, for example, false positive and/or false negatives by the model. In some embodiments, the service may opt to execute the model on the edge device(s) themselves. For example, such a selection may be based on the overhead in reporting the needed telemetry data to the service for prediction, the amount of time needed for the prediction (e.g., some telemetry may indicate a tunnel failure will occur on the order of seconds or less), or the like. In further embodiments, the service may execute the model using telemetry data reported to the service by the edge device(s). If the service predicts a tunnel failure, it may indicate the predicted tunnel failure to the one or more edge devices, to allow the edge device(s) to perform corrective measures, such as rerouting the traffic to another tunnel.

At step 925, as detailed above, the service may retrain the machine learning-based model, based on the received feedback. For example, if the precision or recall of the model is below a threshold, it may retrain the model until the threshold precision or recall is achieved. Model retraining may also entail adjusting the granularity of the model, such as by training a model that is specific to the SD-WAN under scrutiny or even for a particular tunnel in the SD-WAN. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce an architecture for predicting SD-WAN tunnel failures and performing reactive routing before the failures occur.

While there have been shown and described illustrative embodiments that provide for predicting SD-WAN tunnel failures, it is to be understood that various other adaptations and modifications may be made within the spirit and scope of the embodiments herein. For example, while certain embodiments are described herein with respect to using certain models for purposes of predicting tunnel failures, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   instructing, by a device executing a software-defined wide area network (SD-WAN) predictive routing process for an SD-WAN, one or more edge devices in the SD-WAN to report telemetry data to the device at a selected sampling frequency;

obtaining, by the device, the telemetry data from the one or more edge devices according to the selected sampling frequency;

training, by the device and using the telemetry data as training data, a machine learning-based model to predict tunnel failures in the SD-WAN;

after training the machine learning-based model, receiving, at the device, feedback from the one or more edge devices regarding failure predictions made by the machine learning-based model; and retraining, by the device, the machine learning-based model, based on the feedback received from the one or more edge devices.

2. The method as in claim 1, wherein obtaining the telemetry data from the one or more edge devices in the SD-WAN comprises:

associating tunnel failures with telemetry variables, to assign measures of predictive power to the telemetry variables; and selecting one or more of the telemetry variables and the selected sampling frequency, based in part on their associated measures of predictive power.

3. The method as in claim 2, wherein the selected sampling frequency is selected based in part on a computational load imposed on the one or more edge devices by reporting the telemetry data.

4. The method as in claim 1, further comprising:

after training the machine learning-based model, deploying, by the device, the machine learning-based model to a particular one of the one or more edge devices, wherein the feedback is indicative of false positives or false negatives by the machine learning-based model.

5. The method as in claim 1, further comprising:

predicting, by the device and using the machine learning-based model, a tunnel failure of a particular tunnel in the SD-WAN; and indicating, by the device, the tunnel failure that is predicted to the one or more edge devices, wherein the feedback is indicative of whether the tunnel failure occurred.

6. The method as in claim 5, wherein the one or more edge devices reroute traffic from the particular tunnel to another tunnel in the SD-WAN, based on the tunnel failure that is predicted.

7. The method as in claim 1, wherein the device retrains the machine learning-based model until a threshold precision or recall is achieved.

8. The method as in claim 1, wherein the telemetry data is for a plurality of tunnels in the SD-WAN, the method further comprising:

determining that a tunnel-specific model should be trained for a particular tunnel of the plurality of tunnels; and training the machine learning-based model to predict failures of the particular tunnel, using the telemetry data for the particular tunnel.

9. The method as in claim 1, wherein the machine learning-based model is further trained using telemetry data from edge devices in a plurality of other SD-WANs.

10. An apparatus, comprising:

one or more network interfaces to communicate with one or more software-defined wide area networks (SD-WANs);

a processor coupled to the one or more network interfaces and configured to execute one or more processes; and a memory configured to store an SD-WAN predictive routing process that is executable by the processor, the SD-WAN predictive routing process when executed configured to:

instruct one or more edge devices in an SD-WAN to report telemetry data to a device at a selected sampling frequency;

obtain the telemetry data from the one or more edge devices according to the selected sampling frequency;

train, using the telemetry data as training data, a machine learning-based model to predict tunnel failures in the SD-WAN;

after training the machine learning-based model, receive feedback from the one or more edge devices regarding failure predictions made by the machine learning-based model; and retrain the machine learning-based model, based on the feedback received from the one or more edge devices, wherein the apparatus comprises the device.

11. The apparatus as in claim 10, wherein the apparatus obtains the telemetry data from the one or more edge devices in the SD-WAN by:

associating tunnel failures with telemetry variables, to assign measures of predictive power to the telemetry variables; and selecting one or more of the telemetry variables and the selected sampling frequency, based in part on their associated measures of predictive power.

12. The apparatus as in claim 11, wherein the selected sampling frequency is selected based in part on a computational load imposed on the one or more edge devices by reporting the telemetry data.

13. The apparatus as in claim 10, wherein the SD-WAN predictive routing process when executed is further configured to:

after training the machine learning-based model, deploy the machine learning-based model to a particular one of the one or more edge devices, wherein the feedback is indicative of false positives or false negatives by the machine learning-based model.

14. The apparatus as in claim 10, wherein the SD-WAN predictive routing process when executed is further configured to:

predict, using the machine learning-based model, a tunnel failure of a particular tunnel in the SD-WAN; and indicate the tunnel failure that is predicted to the one or more edge devices, wherein the feedback is indicative of whether the tunnel failure occurred.

15. The apparatus as in claim 14, wherein the one or more edge devices reroute traffic from the particular tunnel to another tunnel in the SD-WAN, based on the tunnel failure that is predicted.

16. The apparatus as in claim 10, wherein the apparatus retrains the machine learning-based model until a threshold precision or recall is achieved.

17. The apparatus as in claim 10, wherein the telemetry data is for a plurality of tunnels in the SD-WAN, and wherein the SD-WAN predictive routing process when executed is further configured to:

determine that a tunnel-specific model should be trained for a particular tunnel of the plurality of tunnels; and train the machine learning-based model to predict failures of the particular tunnel, using the telemetry data for the particular tunnel.

18. The apparatus as in claim 10, wherein the machine learning-based model is further trained using telemetry data from edge devices in a plurality of other SD-WANs.

19. A tangible, non-transitory, computer-readable medium that stores program instructions causing a device to execute a software-defined wide area network (SD-WAN) predictive routing process comprising:
- instructing, by the device, one or more edge devices in an SD-WAN to report telemetry data to the device at a selected sampling frequency;
- obtaining, by the device, the telemetry data from the one or more edge devices according to the selected sampling frequency;
- training, by the device and using the telemetry data as training data, a machine learning-based model to predict tunnel failures in the SD-WAN;
- after training the machine learning-based model, receiving, at the device, feedback from the one or more edge devices regarding failure predictions made by the machine learning-based model; and
- retraining, by the device, the machine learning-based model, based on the feedback received from the one or more edge devices.

20. The tangible, non-transitory, computer-readable medium as in claim 19, further comprising:
- predicting, by the device and using the machine learning-based model, a tunnel failure of a particular tunnel in the SD-WAN; and
- indicating, by the device, the tunnel failure that is predicted to the one or more edge devices, wherein the feedback is indicative of whether the tunnel failure occurred.

* * * * *